United States Patent
Miyake et al.

(10) Patent No.: US 10,708,989 B2
(45) Date of Patent: Jul. 7, 2020

(54) PROTECTION CIRCUIT FOR DIMMER, AND DIMMER

(71) Applicant: Panasonic Intellectual Property Management Co., Ltd., Osaka (JP)

(72) Inventors: Tomohiro Miyake, Mie (JP); Kiyoshi Goto, Hyogo (JP); Kengo Miyamoto, Osaka (JP); Masayuki Nakamura, Mie (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/329,440

(22) PCT Filed: Aug. 29, 2017

(86) PCT No.: PCT/JP2017/030824
§ 371 (c)(1),
(2) Date: Feb. 28, 2019

(87) PCT Pub. No.: WO2018/055990
PCT Pub. Date: Mar. 29, 2018

(65) Prior Publication Data
US 2019/0254135 A1    Aug. 15, 2019

(30) Foreign Application Priority Data
Sep. 20, 2016  (JP) .................... 2016-183349

(51) Int. Cl.
*H05B 33/08*  (2020.01)
*H05B 45/10*  (2020.01)
(Continued)

(52) U.S. Cl.
CPC ............. *H05B 45/10* (2020.01); *H05B 45/37* (2020.01); *H05B 45/50* (2020.01); *H05B 47/10* (2020.01); *Y02B 20/42* (2013.01)

(58) Field of Classification Search
CPC ........... H05B 33/0815; H05B 33/0845; H05B 37/02; H05B 39/04; H05B 39/048
See application file for complete search history.

(56) References Cited

U.S. PATENT DOCUMENTS 4,016,451 A * 4/1977 Engel ................. H05B 41/3928
                                                        315/158
4,633,161 A   12/1986 Callahan et al.
(Continued)

FOREIGN PATENT DOCUMENTS

CN     202353846 U    7/2012
CN     105871232 A    8/2016
(Continued)

OTHER PUBLICATIONS

International Search Report issued in Application No. PCT/JP2017/030824 dated Nov. 21, 2017, with English translation.
(Continued)

*Primary Examiner* — Alexander H Taningco
*Assistant Examiner* — Syed M Kaiser
(74) *Attorney, Agent, or Firm* — McDermott Will & Emery LLP (57) ABSTRACT

A control unit controls a bidirectional switch so as to turn the switch from ON to OFF when an amount of time, varying according to a lighting level, passes since a starting point of a half cycle of an AC voltage. When a voltage between both terminals of a capacitive element, connected to a control terminal of the bidirectional switch, becomes equal to or greater than a threshold voltage, the bidirectional switch turns from OFF to ON A first charging/discharging regulator
(Continued)

circuit and a second charging/discharging regulator circuit each make a rate of fall of the voltage between both of the terminals of the capacitive element when the bidirectional switch turns from ON to OFF lower than a rate of rise of the voltage between both of the terminals of the capacitive element when the bidirectional switch turns from OFF to ON.

14 Claims, 3 Drawing Sheets

(51) Int. Cl.
*H05B 45/37* (2020.01)
*H05B 45/50* (2020.01)
*H05B 47/10* (2020.01)

(56) References Cited

U.S. PATENT DOCUMENTS

| | | | |
|---|---|---|---|
| 9,489,005 B2* | 11/2016 | Hausman, Jr. | H05B 45/37 |
| 2011/0043121 A1 | 2/2011 | Matsuda et al. | |
| 2011/0121774 A1* | 5/2011 | Shimada | H02M 1/4233 |
| | | | 318/729 |
| 2013/0170263 A1* | 7/2013 | Newman, Jr. | H05B 45/37 |
| | | | 363/126 |
| 2013/0187563 A1 | 7/2013 | Sasai et al. | |
| 2014/0015441 A1* | 1/2014 | Radermacher | H05B 47/10 |
| | | | 315/294 |
| 2014/0049174 A1* | 2/2014 | Radermacher | H05B 45/40 |
| | | | 315/200 R |
| 2015/0022108 A1* | 1/2015 | Malyna | H05B 45/3575 |
| | | | 315/200 R |
| 2015/0349567 A1* | 12/2015 | Weightman | G11C 5/025 |
| | | | 307/52 |

FOREIGN PATENT DOCUMENTS

| | | |
|---|---|---|
| EP | 2725878 A1 | 4/2014 |
| GB | 2217123 A | 10/1989 |
| JP | H11-185979 A | 7/1999 |
| JP | 2002-009598 A | 1/2002 |
| JP | 2013-149498 A | 8/2013 |
| JP | 2013-251189 A | 12/2013 |
| JP | 2014-233161 A | 12/2014 |
| TW | 201532475 A | 8/2015 |
| TW | 201618597 A | 5/2016 |

OTHER PUBLICATIONS

Extended European Search Report issued in corresponding European Patent Application No. 17852769.3, dated Jul. 16, 2019.

* cited by examiner

PROTECTION CIRCUIT FOR DIMMER, AND DIMMER

RELATED APPLICATIONS

This application is the U.S. National Phase under 35 U.S.C. § 371 of International Application No. PCT/JP2017/030824, filed on Aug. 29, 2017, which in turn claims the benefit Japanese Application No. 2016-183349, filed Sep. 20, 2016, the disclosures of which are incorporated by reference herein.

TECHNICAL FIELD

The present invention relates to a protection circuit for a dimmer configured to control the amount of light emitted by lighting load and also relates to a dimmer itself.

BACKGROUND ART

Dimmers for controlling the amount of light emitted by a lighting load have been known in the art (see, for example, Patent Literature 1).

The dimmer disclosed in Patent Literature 1 includes a pair of terminals, a control circuit unit, a control power supply unit for supplying control power to the control circuit unit, and a lighting control operating unit for setting the lighting level of the lighting load.

Between the pair of terminals, connected in parallel are the control circuit unit and the control power supply unit. In addition, a series circuit of an AC power supply and the lighting load is also connected between the pair of terminals. The lighting load includes a plurality of light-emitting diodes (LEDs) and a power supply circuit for turning these LEDs ON. The power supply circuit includes a smoothing circuit including a diode and an electrolytic capacitor.

The control circuit unit includes a switch unit for performing phase control on an AC voltage supplied to the lighting load, a switch drive unit for driving the switch unit, and a control unit for controlling the switch drive unit and the control power supply unit.

The control power supply unit is connected to the switch unit in parallel. The control power supply unit converts the AC voltage of the AC power supply into control power. The control power supply unit includes an electrolytic capacitor for storing the control power.

The control unit is supplied with the control power by the control power supply unit via the electrolytic capacitor. The control unit includes a microcomputer. The microcomputer performs an inverse phase control for cutting off, according to the lighting level set by the lighting control operating unit, the supply of the power to the lighting load in the middle of a period set for every half cycle of the AC voltage.

The dimmer of Patent Literature 1 performs cutoff control on the switch unit (bidirectional switch) in the middle of the period set for every half cycle of the AC voltage. That is why cutting off the switch unit during a period with a large current value could have counter electromotive force generated by an inductive component (inductance component) included in the impedance of a line, for example.

CITATION LIST

Patent Literature

Patent Literature 1: JP 2013-149498 A

SUMMARY OF INVENTION

It is therefore an object of the present invention to provide a protection circuit, having the ability to reduce the counter electromotive force generated when a bidirectional switch is cut off, for a dimmer and also provide a dimmer itself.

A protection circuit according to an aspect of the present invention is for use in a dimmer including a pair of input terminals, a bidirectional switch, and a control unit. The pair of input terminals is configured to be electrically connected in series between a lighting load and an AC power supply. The bidirectional switch is configured to selectively cut off or pass a bidirectional current between the pair of input terminals. The control unit is configured to control the bidirectional switch so as to turn the bidirectional switch from ON to OFF at a point in time when an amount of time, varying according to a lighting level, passes since a starting point of a half cycle of an AC voltage of the AC power supply. The bidirectional switch has a control terminal, to which a capacitive element is electrically connected. The bidirectional switch turns from OFF to ON when a voltage between both terminals of the capacitive element becomes equal to or greater than a threshold voltage. The protection circuit includes a charging/discharging regulator circuit. The charging/discharging regulator circuit makes a rate of fall of the voltage between both of the terminals of the capacitive element when the control unit turns the bidirectional switch from ON to OFF lower than a rate of rise of the voltage between both of the terminals of the capacitive element when the control unit turns the bidirectional switch from OFF to ON.

A dimmer according to another aspect of the present invention includes a pair of input terminals, a bidirectional switch, a control unit, and the protection circuit for the dimmer. The pair of input terminals is electrically connected in series between a lighting load and an AC power supply. The bidirectional switch is configured to selectively cut off or pass a bidirectional current between the pair of input terminals. The control unit controls the bidirectional switch so as to turn the bidirectional switch from ON to OFF at a point in time when an amount of time, varying according to a lighting level, passes since a starting point of a half cycle of an AC voltage of the AC power supply.

DESCRIPTION OF EMBODIMENTS

First Embodiment (1.1) Configuration

Note that an exemplary configuration to be described below is only one of various embodiments of the present invention and should not be construed as limiting. Rather, those embodiments may be readily modified in various manners depending on a design choice or any other factor without departing from a true spirit and scope of the invention.

Figure 1:
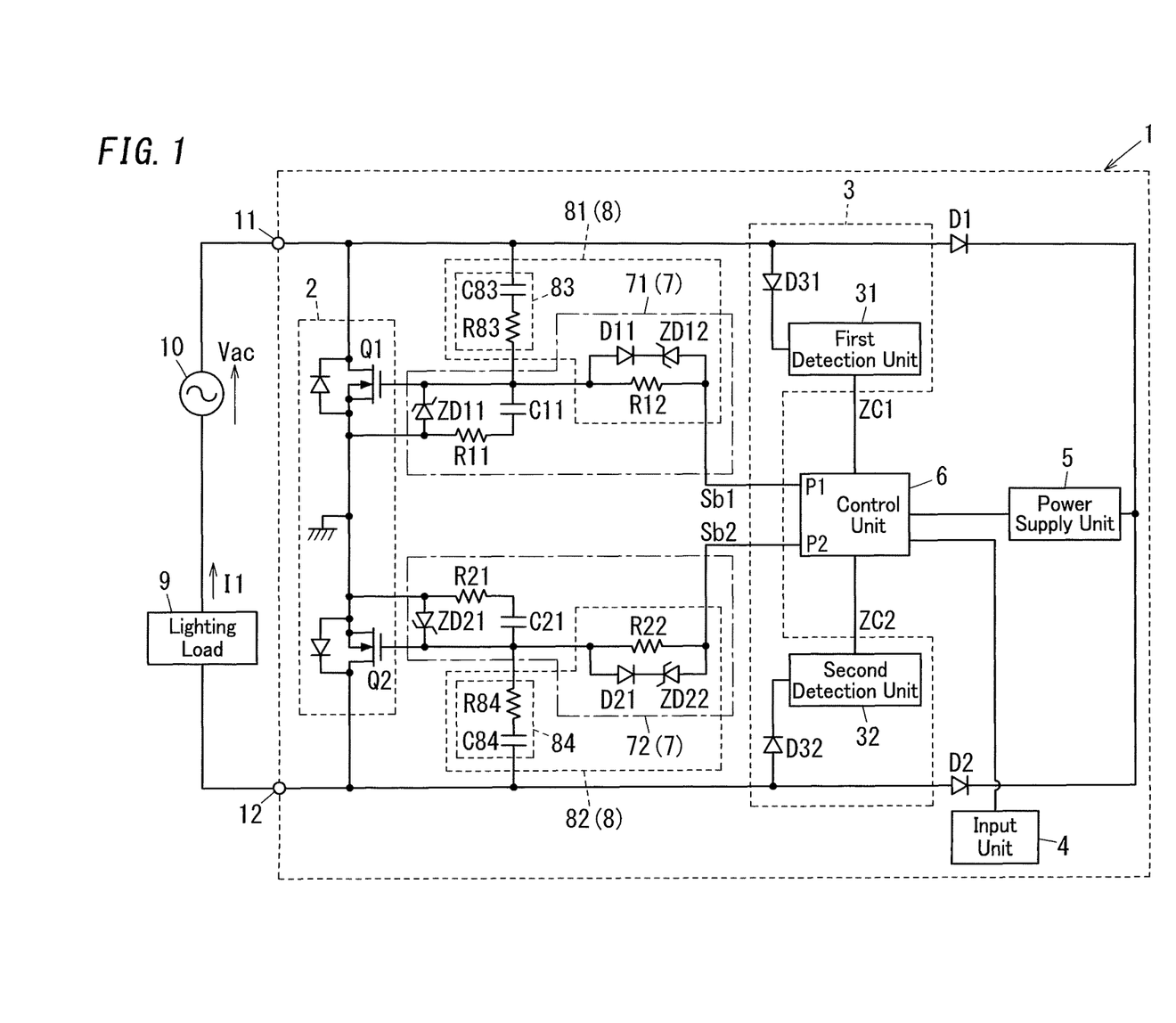
FIG. 1 is a circuit diagram of a dimmer according to a first embodiment.

As shown in FIG. 1, the dimmer 1 of this embodiment includes a pair of input terminals 11 and 12, a bidirectional switch 2, a phase detection unit 3, an input unit 4, a power supply unit 5, a control unit 6, a switch drive unit 7, and a protection circuit 8. As used herein, the "input terminals" do not have to be parts (terminals) to which electric wires, cables, or any other members are connected but may also be leads of an electronic part or a portion of a conductor included in a circuit board, for example.

The dimmer 1 is implemented as a two-wire dimmer and is used as being electrically connected in series to a load 9 with respect to an AC power supply 10. The load 9 is a lighting load and is lit when supplied with electricity. The load 9 includes LED elements serving as a light source and a lighting circuit for lighting the LED elements. The AC power supply 10 may be implemented as a single-phase 100 V, 60 Hz commercial power supply, for example. This dimmer 1 is applicable to a wall switch, for example.

The bidirectional switch 2 may be made up of two elements, namely, a switching element Q1 and a second switching element Q2, which are electrically connected in series between the input terminals 11 and 12, for example. Each of these switching elements Q1 and Q2 may be implemented as, for example, a semiconductor switching element such as an enhancement n-channel metal-oxide-semiconductor field-effect transistor (n-MOSFET).

These switching elements Q1 and Q2 are connected together in a so-called "anti-series" fashion between the input terminals 11 and 12. That is to say, the switching elements Q1 and Q2 have their respective sources connected together. The drain of the switching element Q1 is connected to the input terminal 11, and the drain of the switching element Q2 is connected to the input terminal 12. The respective sources of the switching elements Q1 and Q2 are connected to the ground of the power supply unit 5. The ground of the power supply unit 5 defines a reference potential for the internal circuit of the dimmer 1.

The bidirectional switch 2 may have its state switched from one of four different states to another according to the combination of ON and OFF states of the switching elements Q1 and Q2. Specifically, the four states consist of: a bidirectional OFF state in which the switching elements Q1 and Q2 are both OFF; a bidirectional ON state in which the switching elements Q1 and Q2 are both ON; and two unidirectional ON states in each of which only one of the switching elements Q1 and Q2 is ON. In each of the unidirectional ON states, the elements between the pair of input terminals 11 and 12 become electrically conductive unidirectionally via one ON-state switching element and a parasitic diode of the other OFF-state switching element, out of the two switching elements Q1 and Q2. For example, in a situation where the switching element Q1 is ON and the switching element Q2 is OFF, a first unidirectional ON state is established where a current is allowed to flow from the input terminal 11 toward the input terminal 12. On the other hand, in a situation where the switching element Q2 is ON and the switching element Q1 is OFF, a second unidirectional ON state is established where a current is allowed to flow from the input terminal 12 toward the input terminal 11. Thus, in a situation where an AC voltage Vac is applied from the AC power supply 10 to between the input terminals 11 and 12, in a half cycle in which the AC voltage Vac is positive (i.e., the input terminal 11 is positive), the first unidirectional ON state becomes a "forward ON state" and the second unidirectional ON state becomes a "reverse ON state." On the other hand, in a half cycle in which the AC voltage Vac is negative (i.e., the input terminal 12 is positive), the second unidirectional ON state becomes a "forward ON state" and the first unidirectional ON state becomes a "reverse ON state."

In this case, the bidirectional switch 2 is ON in both of the "bidirectional ON state" and the "forward ON state," and is OFF in both of the "bidirectional OFF state" and the "reverse ON state."

The phase detection unit 3 detects the phase of the AC voltage Vac applied between the input terminals 11 and 12. As used herein, the "phase" includes a zero-crossing point of the AC voltage Vac and the polarity (which is positive or negative) of the AC voltage Vac. The phase detection unit 3 is configured to output, on detecting a zero-crossing point of the AC voltage Vac, a detection signal to the control unit 6. The phase detection unit 3 includes a diode D31, a first detection unit 31, a diode D32, and a second detection unit 32. The first detection unit 31 is electrically connected to the input terminal 11 via the diode D31. The second detection unit 32 is electrically connected to the input terminal 12 via the diode D32. The first detection unit 31 detects a zero-crossing point when the AC voltage Vac makes a transition from a half cycle with negative polarity to a half cycle with positive polarity. The second detection unit 32 detects a zero-crossing point when the AC voltage Vac makes a transition from a half cycle with positive polarity to a half cycle with negative polarity.

That is to say, on detecting that the voltage regarding the input terminal 11 as a positive electrode has made a transition from a state where the voltage is less than a predetermined value to a state where the voltage is equal to or greater than the predetermined value, the first detection unit 31 determines that a zero-crossing point should have been detected and outputs a first detection signal ZC1 to the control unit 6. Likewise, on detecting that the voltage regarding the input terminal 12 as a positive electrode has made a transition from a state where the voltage is less than a predetermined value to a state where the voltage is equal to or greater than the predetermined value, the second detection unit 32 determines that a zero-crossing point should have been detected and outputs a second detection signal ZC2 to the control unit 6. The predetermined value is a value (absolute value) set at around 0 V. For example, the first detection unit 31 may have a predetermined value on the order of a few V, and the second detection unit 32 may also have a predetermined value on the order of a few V. Therefore, the zero-crossing point detected by each of the first detection unit 31 and the second detection unit 32 is slightly delayed with respect to a zero-crossing point (of 0 V) in a strict sense.

The input unit 4 receives a signal representing a lighting level from an operating unit to be operated by the user and outputs it as a lighting control signal to the control unit 6. In outputting the lighting control signal, the input unit 4 may or may not process the received signal. The lighting control signal may be, for example, a numerical value specifying the magnitude of the optical output of the load 9, and may sometimes include an "OFF level" that turns the load 9 into an extinct state. The operating unit only needs to be configured to output a signal representing the lighting level to the input unit 4 in response to the user's operation, and may be implemented, for example, as a variable resistor, a rotary switch, a touchscreen panel, a remote controller, or a telecommunications device such as a smartphone.

The control unit 6 includes a microcomputer, for example. The microcomputer performs the function of the control unit 6 by having a program stored in a memory of the microcomputer executed by a central processing unit (CPU). The program executed by the CPU may be stored in advance in the memory of the microcomputer, or may be provided by being stored in a storage medium such as a memory card or by being downloaded through a telecommunications line. In other words, the program is designed to make a computer (e.g., the microcomputer in this example) serve as the control unit 6.

The control unit 6 controls the bidirectional switch 2 in accordance with the detection signals from the phase detection unit 3 and the lighting control signal from the input unit 4. The control unit 6 controls the switching elements Q1 and Q2 separately. Specifically, the control unit 6 controls the switching elements Q1 and Q2 with a first control signal Sb1 and a second control signal Sb2, respectively.

Optionally, the control unit 6 may include a level shifter. The level shifter transforms a voltage value of the control signal output from the microcomputer into voltage values with which the switching elements Q1 and Q2 are able to be driven, and outputs the latter voltage values to the switch drive unit 7. For example, the microcomputer outputs a control signal with H (High) level (with a voltage of 5 V, for example) to turn the switching elements Q1 and Q2 ON, and outputs a control signal with L (Low) level (with a voltage of 0 V, for example) to turn the switching elements Q1 and Q2 OFF. When the microcomputer outputs an H-level control signal, the level shifter transforms a voltage value of this control signal into 12 V, for example, and outputs a first control signal Sb1 and a second control signal Sb2, both having an H level, to the switch drive unit 7. On the other hand, when the microcomputer outputs an L-level control signal, the level shifter outputs a first control signal Sb1 and a second control signal Sb2, both having an L level (with a voltage of 0 V, for example), to the switch drive unit 7. In the following description, the first control signal Sb1 and second control signal Sb2, of which the signal level is H level, will be hereinafter referred to as "ON" signals, and the first control signal Sb1 and second control signal Sb2, of which the signal level is L level, will be hereinafter referred to as "OFF" signals.

The switch drive unit 7 includes a first drive unit 71 for driving (i.e., controlling the ON/OFF states of) the switching element Q1 and a second drive unit 72 for driving (i.e., controlling the ON/OFF states of) the switching element Q2.

The first drive unit 71 includes Zener diodes ZD11 and ZD12, resistors R11 and R12, a capacitive element (capacitor) C11, and a diode D11. The capacitive element C11 and the resistor R11 are connected in series between the gate (control terminal) and source of the switching element Q1. In addition, the Zener diode ZD11 is also connected between the gate and source of the switching element Q1 for the purpose of overvoltage protection. The gate of the switching element Q1 is connected to the output terminal P1 of the control unit 6 via the resistor R12. The anode of the diode D11 is further connected to the gate of the switching element Q1. The cathode of the Zener diode ZD12 is connected to the cathode of the diode D11, and the anode of the Zener diode ZD12 is connected to the output terminal P1 of the control unit 6. The control unit's 6 outputting a first control signal Sb1 at H level from the output terminal P1 to the first drive unit 71 allows a current to flow through the capacitive element C11 and charges the capacitive element C11, thus applying a voltage between both terminals of the capacitive element C11 to the gate of the switching element Q1. When the voltage between both terminals of the capacitive element C11 becomes equal to or greater than the threshold voltage of the switching element Q1, the switching element Q1 turns ON. On the other hand, the control unit's 6 outputting a first control signal Sb1 at L level from the output terminal P1 to the first drive unit 71 discharges the capacitive element C11. When the voltage between both terminals of the capacitive element C11 becomes less than the threshold voltage of the switching element Q1, the switching element Q1 turns OFF. In this manner, the first drive unit 71 controls the ON/OFF states of the switching element Q1 in accordance with the first control signal Sb1 from the control unit 6. In this case, the first drive unit 71 generates a gate voltage by reference to the source potential of the switching element Q1.

The second drive unit 72 includes Zener diodes ZD21 and ZD22, resistors R21 and R22, a capacitive element (capacitor) C21, and a diode D21. The capacitive element C21 and the resistor R21 are connected in series between the gate (control terminal) and source of the switching element Q2. In addition, the Zener diode ZD21 is also connected between the gate and source of the switching element Q2 for the purpose of overvoltage protection. The gate of the switching element Q2 is connected to the output terminal P2 of the control unit 6 via the resistor R22. The anode of the diode D21 is further connected to the gate of the switching element Q2. The cathode of the Zener diode ZD22 is connected to the cathode of the diode D21, and the anode of the Zener diode ZD22 is connected to the output terminal P2 of the control unit 6. The control unit's 6 outputting a second control signal Sb2 at H level from the output terminal P2 to the second drive unit 72 allows a current to flow through the capacitive element C21 and charges the capacitive element C21, thus applying a voltage between both terminals of the capacitive element C21 to the gate of the switching element Q2. When the voltage between both terminals of the capacitive element C21 becomes equal to or greater than the threshold voltage of the switching element Q2, the switching element Q2 turns ON. On the other hand, the control unit's 6 outputting a second control signal Sb2 at L level from the output terminal P2 to the second drive unit 72 discharges the capacitive element C21. When the voltage between both terminals of the capacitive element C21 becomes less than the threshold voltage of the switching element Q2, the switching element Q2 turns OFF. In this manner, the second drive unit 72 controls the ON/OFF states of the switching element Q2 in accordance with the second control signal Sb2 from the control unit 6. In this case, the second drive unit 72 generates a gate voltage by reference to the source potential of the switching element Q2.

The protection circuit 8 is provided to reduce the counter electromotive force generated in the AC voltage Vac when the bidirectional switch 2 turns from ON to OFF. The protection circuit 8 of this embodiment includes a first charging/discharging regulator circuit 81 for reducing the counter electromotive force generated when the switching element Q1 is cut off and a second charging/discharging regulator circuit 82 for reducing the counter electromotive force generated when the switching element Q2 is cut off.

The first charging/discharging regulator circuit 81 includes the resistor R12, diode D11, and Zener diode ZD12 of the first drive unit 71 and an auxiliary charging circuit 83. The auxiliary charging circuit 83 includes a series circuit of a capacitive element (capacitor) C83 and a resistor R83, which are connected in series between the input terminal 11 and the gate of the switching element Q1. Note that the diode D11 and the Zener diode ZD12 are not essential constituent elements for the first charging/discharging regulator circuit 81. In other words, the first charging/discharging regulator circuit 81 does not have to include diode D11 and the Zener diode ZD12.

The second charging/discharging regulator circuit 82 includes the resistor R22, diode D21, and Zener diode ZD22 of the second drive unit 72 and an auxiliary charging circuit 84. The auxiliary charging circuit 84 includes a series circuit of a capacitive element (capacitor) C84 and a resistor R84, which are connected in series between the input terminal 12 and the gate of the switching element Q2. Note that the diode D21 and the Zener diode ZD22 are not essential constituent elements for the second charging/discharging regulator circuit 82. In other words, the second charging/discharging regulator circuit 82 does not have to include diode D21 and the Zener diode ZD22.

The power supply unit 5 may include an electrolytic capacitor, for example. The power supply unit 5 is electrically connected to the input terminal 11 via a diode D1 and also electrically connected to the input terminal 12 via a diode D2. Also, the ground of the power supply unit 5 is electrically connected to a connection node where the respective parasitic diodes of the switching elements Q1 and Q2 are connected together. This allows the AC voltage Vac applied between the input terminals 11 and 12 to be full-wave rectified, and supplied to the power supply unit 5, by a diode bridge formed by the diodes D1 and D2 and the respective parasitic diodes of the switching elements Q1 and Q2. Therefore, while the bidirectional switch 2 is OFF, the full-wave rectified AC voltage Vac (i.e., a pulsating voltage output from the diode bridge) is applied to the power supply unit 5. The power supply unit 5 smooths out the full-wave rectified AC voltage Vac and supplies an operating voltage to the phase detection unit 3, the control unit 6, and the switch drive unit 7.

A lighting circuit for the load 9 detects the lighting level thereof based on the waveform of the AC voltage Vac, of which the phase is controlled by the dimmer 1, thus changing the magnitude of the optical output of the LED elements. In this embodiment, the lighting circuit may include, for example, a current securing circuit such as a bleeder circuit. This allows a current to flow through the load 9 even in a period during which the bidirectional switch 2 of the dimmer 1 is electrically unconductive.

(1.2) Operation (1.2.1) Activation Operation

First of all, it will be described how the dimmer 1 of this embodiment performs an activation operation when electricity starts to be supplied thereto.

The dimmer 1 with the configuration described above allows, when the AC power supply 10 is connected between the input terminals 11 and 12 via the load 9, the AC voltage Vac applied from the AC power supply 10 to between the input terminals 11 and 12 to be rectified and supplied to the power supply unit 5. In the meantime, the power supply unit 5 supplies an operating voltage to the control unit 6 and other units, thus activating the control unit 6.

When activated, the control unit 6 determines the frequency of the AC power supply 10 in accordance with a detection signal supplied from the phase detection unit 3. Then, the control unit 6 refers to a numerical value table, stored in advance in a memory, according to the frequency determined, thus setting time and various other parameters. In this case, if the lighting level input to the input unit 4 is OFF level, then the control unit 6 maintains the bidirectional switch 2 in bidirectionally OFF state, thus keeping the impedance between the pair of input terminals 11 and 12 high. This allows the load 9 to maintain an extinct state.

(1.2.2) Lighting Control Operation

Next, it will be described how the dimmer 1 of this embodiment performs lighting control operation. Note that in the following description, the phrase "from a point in time A" refers herein to a period that starts from, and does include, the point in time A. For example, the phrase "from a starting point of a half cycle" refers herein to a period including the starting point of the half cycle. Meanwhile, the phrase "to a point in time A" refers herein to a period that terminates immediately before, and does not include, the point in time A. For example, the phrase "to an end point of a half cycle" refers herein to a period that terminates immediately before, and does not include, the end point of the half cycle.

First, it will be described how the dimmer 1 operates in a half cycle during which the AC voltage Vac is positive.

The dimmer 1 makes the phase detection unit 3 detect a zero-crossing point of the AC voltage Vac, which is used as a reference for phase control. When the AC voltage Vac, which is making a transition from a half cycle with negative polarity to a half cycle with positive polarity, reaches a prescribed value with positive polarity, the first detection unit 31 outputs a first detection signal ZC1 to the control unit 6.

On receiving the first detection signal ZC1 from the first detection unit 31 in the half cycle during which the AC voltage Vac is positive, the control unit 6 turns the first control signal Sb1 and the second control signal Sb2 into "ON" signals.

This allows, in the first drive unit 71, a current to flow through the capacitive element C11 via the resistor R12 to increase the voltage between both terminals of the capacitive element C11. When the voltage between both terminals of the capacitive element C11 becomes equal to or greater than a threshold voltage, the switching element Q1 turns ON. Likewise, in the second drive unit 72, a current is allowed to flow through the capacitive element C21 via the resistor R22 to increase the voltage between both terminals of the capacitive element C21. When the voltage between both terminals of the capacitive element C21 becomes equal to or greater than a threshold voltage, the switching element Q2 turns ON. At this time, the switching elements Q1 and Q2 both turn ON to let the bidirectional switch 2 enter the bidirectional ON state. Thus, power is supplied from the AC power supply 10 to the load 9 via the bidirectional switch 2, thus lighting the load 9.

Meanwhile, at the end point of the half cycle during which the AC voltage Vac is negative, the bidirectional switch 2 is controlled to maintain the bidirectional OFF state. Thus, in the interval from the starting point of the half cycle with positive polarity to a point in time when the first detection signal ZC1 is input, the control unit 6 maintains the bidirectional switch 2 in the bidirectional OFF state.

At a point in time when an ON-state period, of which the duration is determined by the lighting control signal, passes since a point in time when the first detection signal ZC1 is input, the control unit 6 turns the first control signal Sb1 into an "OFF" signal while keeping the second control signal Sb2 the "ON" signal.

At this time, in the first drive unit 71, if the voltage between both terminals of the capacitive element C11 is greater than the Zener voltage of the Zener diode ZD12, then the Zener diode ZD12 turns ON (i.e., becomes electrically conductive). Since a discharging current flows from the capacitive element C11 through the diode D11 and the Zener diode ZD12, the voltage between both terminals of the capacitive element C11 falls down to the Zener voltage of the Zener diode ZD12 in a short time. Once the voltage between both terminals of the capacitive element C11 has become lower than the Zener voltage of the Zener diode ZD12, the Zener diode ZD12 turns OFF (i.e., becomes electrically unconductive, or no longer allows a current to flow therethrough), and a discharging current flows from the capacitive element C11 via the resistor R12. Thereafter, when the voltage between both terminals of the capacitive element C11 becomes lower than the threshold voltage, a load current flowing through the switching element Q1 decreases.

Figure 2A:
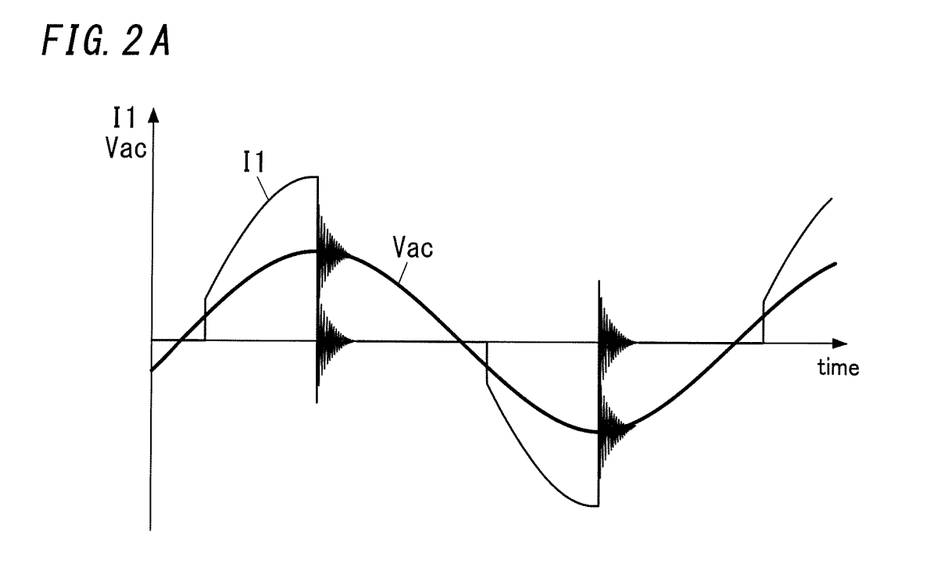
FIG. 2A illustrates the waveforms of an AC voltage of an AC power supply and a load current for a dimmer with no protection circuits.

In this case, the impedance of the electrical path and other components connecting the dimmer 1, the AC power supply 10, and the load 9 together includes an inductance component. Thus, when the load current flowing through the switching element Q1 decreases, counter electromotive force is generated by the inductance component included in the impedance of the electrical path and other components. FIG. 2A illustrates the waveforms of the AC voltage Vac of the AC power supply 10 and a load current I1 for a dimmer with no protection circuits 8. In this case, the counter electromotive force, generated at a timing when the bidirectional switch 2 turns from ON to OFF, is superposed on the AC voltage Vac. Also, as the amount of the load current flowing when the switching element Q1 turns from ON to OFF increases, the counter electromotive force generated by the inductance component of the electrical path increases.

The dimmer 1 of this embodiment includes the first charging/discharging regulator circuit 81 for reducing the counter electromotive force generated when the switching element Q1 is cut off. The first charging/discharging regulator circuit 81 includes the auxiliary charging circuit 83 between the input terminal 11 and the gate of the switching element Q1. The auxiliary charging circuit 83 is configured to allow a charging current to flow from the input terminal 11 to the capacitive element C11 according to the voltage value of the voltage applied to the input terminal 11.

Figure 2B:
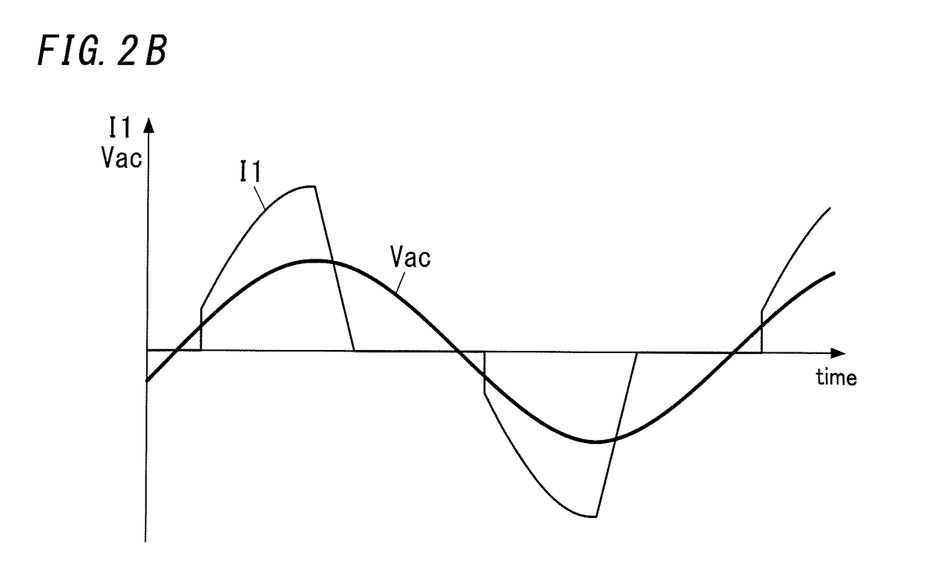
FIG. 2B illustrates the waveforms of an AC voltage of an AC power supply and a load current for a dimmer according to the first embodiment.

Therefore, when counter electromotive force is generated on an electrical path, to which the dimmer 1 is connected, while the switching element Q2 is turning from ON to OFF, a current flows from the input terminal 11 to the capacitive element C11 via the capacitive element C83 and resistor R83 of the auxiliary charging circuit 83. This makes the rate of fall of the voltage between both terminals of the capacitive element C11 lower than in a situation where no charging current flows through the auxiliary charging circuit 83 to the capacitive element C11. This slows down the rate of decrease in the amount of the current flowing through the switching element Q1. Therefore, this slows down the rate of decrease in the amount of the load current I1 flowing through the switching element Q1, thus reducing the counter electromotive force to be generated on the electrical path. FIG. 2B illustrates the waveforms of the AC voltage Vac of the AC power supply 10 and the load current I1 for the dimmer 1 according to this embodiment. As can be seen, the counter electromotive force to be generated on the electrical path when the switching element Q2 turns from ON to OFF has decreased. In this case, the time constant of the series circuit of the capacitive element C83 and the resistor R83 (hereinafter referred to as a "CR circuit") that form the auxiliary charging circuit 83 is set at such a value as to allow the counter electromotive force, generated on the electrical path, to be reduced to the extent that the circuit components are not affected adversely by the counter electromotive force.

Thereafter, the voltage between both terminals of the capacitive element C11 falls gradually and the load current flowing through the switching element Q1 decreases to turn the switching element Q1 OFF eventually. At this time, only the switching element Q1 turns OFF, out of the switching elements Q1 and Q2, to let the bidirectional switch 2 enter a reverse ON state. This cuts off the supply of power from the AC power supply 10 to the load 9.

Also, at a point in time when a half cycle minus a certain amount of time passes from the point in time of generation of the first detection signal ZC1, the control unit 6 turns the first control signal Sb1 and the second control signal Sb2 into "OFF" signals. The point in time to turn the first control signal Sb1 and the second control signal Sb2 into "OFF" signals only needs to be before the end point of the half cycle (zero-crossing point), and the time length (corresponding to the certain amount of time) through the end point of the half cycle may be set appropriately.

At this time, in the second drive unit 72, if the voltage between both terminals of the capacitive element C21 is greater than the Zener voltage of the Zener diode ZD22, then the Zener diode ZD22 turns ON. Since a discharging current flows from the capacitive element C21 through the diode D21 and the Zener diode ZD22, the voltage between both terminals of the capacitive element C21 falls down to the Zener voltage of the Zener diode ZD22 in a short time. Once the voltage between both terminals of the capacitive element C21 has become lower than the Zener voltage of the Zener diode ZD22, the Zener diode ZD22 turns OFF, and a discharging current flows from the capacitive element C21 via the resistor R22. Thereafter, when the voltage between both terminals of the capacitive element C21 becomes lower than the threshold voltage, the switching element Q2 turns OFF. That is to say, the switching elements Q1 and Q2 both turn OFF to let the bidirectional switch 2 enter the bidirectional OFF state.

In the half cycle during which the AC voltage Vac is negative, the dimmer 1 operates basically in the same way as in the half cycle during which the AC voltage Vac is positive.

In the half cycle with negative polarity, when the AC voltage Vac reaches a prescribed value with negative polarity, the second detection unit 32 outputs a second detection signal ZC2 to the control unit 6.

On receiving the second detection signal ZC2 from the second detection unit 32 in the half cycle during which the AC voltage Vac is negative, the control unit 6 turns the first control signal Sb1 and the second control signal Sb2 into "ON" signals.

This allows, in the first drive unit 71, a current to flow through the capacitive element C11 via the resistor R12 to increase the voltage between both terminals of the capacitive element C11. When the voltage between both terminals of the capacitive element C11 becomes equal to or greater than a threshold voltage, the switching element Q1 turns ON. Likewise, in the second drive unit 72, a current is allowed to flow through the capacitive element C21 via the resistor R22 to increase the voltage between both terminals of the capacitive element C21. When the voltage between both terminals of the capacitive element C21 becomes equal to or greater than a threshold voltage, the switching element Q2 turns ON. At this time, the switching elements Q1 and Q2 both turn ON to let the bidirectional switch 2 enter the bidirectional ON state. Thus, power is supplied from the AC power supply 10 to the load 9 via the bidirectional switch 2, thus lighting the load 9.

Meanwhile, at the end point of the half cycle during which the AC voltage Vac is positive, the bidirectional switch 2 is controlled to maintain the bidirectional OFF state. Thus, in the interval from the starting point of the half cycle with negative polarity to a point in time when the second detection signal ZC2 is input, the control unit 6 maintains the bidirectional switch 2 in the bidirectional OFF state.

Thereafter, at a point in time when an ON-state period, of which the duration is determined by the lighting control signal, passes since a point in time when the second detection signal ZC2 is input in the half cycle during which the AC voltage Vac is negative, the control unit 6 turns the second control signal Sb2 into an "OFF" signal while keeping the first control signal Sb1 the "ON" signal.

Thus, in the second drive unit 72, a discharging current flows from the capacitive element C21 via the resistor R22. When the voltage between both terminals of the capacitive element C21 becomes lower than the threshold voltage, the load current flowing through the switching element Q2 decreases.

In this case, when the load current flowing through the switching element Q2 decreases, counter electromotive force is generated by, for example, the inductance component included in the impedance of the electrical path and other components that connect the dimmer 1, the AC power supply 10, and the load 9 together. As the amount of the load current flowing when the switching element Q2 turns from ON to OFF increases, the counter electromotive force generated by the inductance component of the electrical path increases.

The dimmer 1 of this embodiment includes the second charging/discharging regulator circuit 82 for reducing the counter electromotive force to be generated when the switching element Q2 is cut off. The second charging/discharging regulator circuit 82 includes the auxiliary charging circuit 84 between the input terminal 12 and the gate of the switching element Q2. The auxiliary charging circuit 84 is configured to allow a charging current to flow from the input terminal 12 to the capacitive element C21 according to the voltage value of the voltage applied to the input terminal 12.

Therefore, when counter electromotive force is generated as a surge voltage on an electrical path, to which the dimmer 1 is connected, while the switching element Q2 is turning from ON to OFF, a current flows from the input terminal 12 to the capacitive element C21 via the capacitive element C84 and resistor R84 of the auxiliary charging circuit 84. This slows down the rate of fall of the voltage between both terminals of the capacitive element C21, and therefore, slows down the rate of decrease in the amount of the load current flowing through the switching element Q2. This reduces the counter electromotive force to be generated on the electrical path. In this case, the time constant of the series circuit of the capacitive element C84 and the resistor R84 (hereinafter referred to as a "CR series circuit") that form the auxiliary charging circuit 84 is set at such a value as to allow the counter electromotive force, generated on the electrical path, to be reduced to the point that the circuit components are not affected adversely.

Thereafter, the voltage between both terminals of the capacitive element C21 falls gradually and the load current flowing through the switching element Q2 decreases to turn the switching element Q2 OFF eventually. At this time, only the switching element Q2 turns OFF, out of the switching elements Q1 and Q2, to let the bidirectional switch 2 enter a reverse ON state. This cuts off the supply of power from the AC power supply 10 to the load 9.

Also, at a point in time when a half cycle minus a certain amount of time passes since the point in time of generation of the second detection signal ZC2 in the half cycle during which the AC voltage Vac is negative, the control unit 6 turns the first control signal Sb1 and the second control signal Sb2 into "OFF" signals.

At this time, in the first drive unit 71, if the voltage between both terminals of the capacitive element C11 is greater than the Zener voltage of the Zener diode ZD12, then the Zener diode ZD12 turns ON. Since a discharging current flows from the capacitive element C11 through the diode D11 and the Zener diode ZD12, the voltage between both terminals of the capacitive element C11 falls down to the Zener voltage of the Zener diode ZD12 in a short time. Once the voltage between both terminals of the capacitive element C11 has become lower than the Zener voltage of the Zener diode ZD12, the Zener diode ZD12 turns OFF, and a discharging current flows from the capacitive element C11 via the resistor R12. Thereafter, when the voltage between both terminals of the capacitive element C11 becomes lower than the threshold voltage, the switching element Q1 turns OFF. That is to say, the switching elements Q1 and Q2 both turn OFF to let the bidirectional switch 2 enter the bidirectional OFF state.

The dimmer 1 of this embodiment alternately and repeatedly performs the operation for the half cycle with positive polarity and the operation for the half cycle with negative polarity every half cycle of the AC voltage Vac, thereby controlling the amount of light emitted by the load 9.

As used herein, the "bidirectional ON state" refers to the ON state of the bidirectional switch 2, and the "reverse ON state" refers to the OFF state of the bidirectional switch 2. Also, when a variable amount of time passes since the starting point of a half cycle of the AC voltage Vac (i.e., at a switching point), the bidirectional switch 2 turns from ON to OFF.

As used herein, the "variable amount of time" corresponds to an interval from the starting point of a half cycle to a point in time when an ON-state period, of which the duration is determined by the lighting control signal, has passed since the generation of the first detection signal ZC1 and the second detection signal ZC2. That is to say, the "variable amount of time" is the sum of the interval from the starting point of the half cycle to the point in time of generation of the first detection signal ZC1 and the second detection signal ZC2 and the ON state period with the duration determined by the lighting control signal. Thus, the variable amount of time has a length varying according to the lighting level, and the phase of the switching point with respect to the AC voltage Vac also varies according to the lighting level. That is to say, to decrease the optical output of the load 9, the variable amount of time is defined to be a shorter amount of time. On the other hand, to increase the optical output of the load 9, the variable amount of time is defined to be a longer amount of time. This allows the magnitude of the optical output of the load 9 to be adjusted according to the lighting level provided for the input unit 4.

(1.3) Advantages

A protection circuit 8 according to a first aspect is designed for use in a dimmer 1. The dimmer 1 includes a pair of input terminals 11 and 12 configured to be electrically connected in series between a lighting load (load 9) and an AC power supply 10, a bidirectional switch 2, and a control unit 6. The bidirectional switch 2 is configured to selectively cut off or pass a bidirectional current between the pair of input terminals 11 and 12. The control unit 6 controls the bidirectional switch 2 so as to turn the bidirectional switch 2 from ON to OFF at a point in time when an amount of time, varying according to a lighting level, passes since a starting point of a half cycle of an AC voltage Vac of the AC power supply 10. A capacitive element C11, C21 is electrically connected to a control terminal of the bidirectional switch 2 (the gate of the switching element Q1, Q2). The bidirectional switch 2 turns from OFF to ON when a voltage between both terminals of the capacitive element C11, C21 becomes equal to or greater than a threshold voltage. The protection circuit 8 includes a charging/discharging regulator circuit (the first charging/discharging regulator circuit 81 or the second charging/discharging regulator circuit 82). The charging/discharging regulator circuit makes a rate of fall of the voltage between both of the terminals of the capacitive element C11, C21 when the control unit 6 turns the bidirectional switch 2 from ON to OFF lower than a rate of rise of the voltage between both of the terminals of the capacitive element C11, C21 when the control unit 6 turns the bidirectional switch 2 from OFF to ON.

In the dimmer 1, when the bidirectional switch 2 turns from ON to OFF, counter electromotive force could be generated on an electrical path, to which the dimmer 1 is connected, by an inductance component such as the electrical path. The protection circuit 8 of this embodiment slows down the rate of the bidirectional switch 2 turning ON to OFF, compared to a configuration in which the dimmer 1 includes no protection circuits 8. This reduces the counter electromotive force to be generated on an electrical path connected to the input terminals 11 and 12 when the bidirectional switch 2 turns from ON to OFF.

The dimmer 1 of this embodiment includes the pair of input terminals 11 and 12, the bidirectional switch 2, the control unit 6, and the protection circuit 8. This reduces the counter electromotive force to be generated on the electrical path connected to the input terminals 11 and 12 when the bidirectional switch 2 turns from ON to OFF.

In a protection circuit 8 for a dimmer 1 according to a second aspect, which may be implemented in conjunction with the first aspect, the charging/discharging regulator circuit (the first charging/discharging regulator circuit 81 or the second charging/discharging regulator circuit 82) includes an auxiliary charging circuit 83, 84 configured to allow a charging current to flow from the pair of input terminals 11 and 12 to the capacitive element C11, C21. The auxiliary charging circuit 83, 84 changes a current value of the charging current according to a voltage value of a voltage applied between the pair of input terminals 11 and 12. If counter electromotive force is generated on the electrical path when the bidirectional switch 2 turns from ON to OFF, the amount of the charging current allowed by the auxiliary charging circuit 83, 84 to flow through the capacitive element C11, C12 increases. This slows down the rate of fall of the voltage between both terminals of the capacitive element C11, C12, thus reducing the counter electromotive force to be generated on the electrical path connected to the input terminals 11 and 12 when the bidirectional switch 2 turns from ON to OFF. In this case, as the voltage value of the voltage applied between the pair of input terminals 11 and 12 increases, the auxiliary charging circuit 83, 84 may increase the current value of the charging current. If necessary, the auxiliary charging circuit 83, 84 may change the current value of the charging current within a range including zero.

In a protection circuit 8 for a dimmer 1 according to a third aspect, which may be implemented in conjunction with the second aspect, the auxiliary charging circuit 83, 84 includes a series circuit of another capacitive element C83, C84 and a resistor R83, R84. This allows a rate of the bidirectional switch 2 turning from ON to OFF to be adjusted with a time constant set by the capacitive element C83, C84 and the resistor R83, R84.

In a protection circuit 8 for a dimmer 1 according to a fourth aspect, which may be implemented in conjunction with the second or third aspect, the auxiliary charging circuit 83, 84 includes a passive component (the capacitive element C83, C84 and the resistor R83, R84). Implementing the auxiliary charging circuit 83, 84 as at least one passive component eliminates the need for providing any power supply for operating the auxiliary charging circuit 83, 84 or a circuit for controlling the operation of the auxiliary charging circuit 83, 84.

(1.4) Variations

Next, variations of the embodiment described above will be enumerated one after another. Note that any of various configurations of the variations to be described below may be adopted as appropriate in combination with any of the configurations described for the embodiment.

The protection circuit 8 of the embodiment described above includes the auxiliary charging circuits 83 and 84, each of which is implemented as a CR series circuit. However, this is only an example and should not be construed as limiting. The auxiliary charging circuits 83 and 84 do not have to be implemented as CR series circuits. Alternatively, the auxiliary charging circuits 83 and 84 may each consist of a capacitive element. Still alternatively, the auxiliary charging circuits 83 and 84 may each include a resistor connected between the input terminal 11, 12 and the capacitive element C11, C12, and a Zener diode connected to the resistor in series such that a current flows in the opposite direction from the input terminal to the capacitive element. In that case, only when the voltage applied to the input terminal 11, 12 is greater than the voltage between both terminals of the Zener diode, the charging current is allowed to flow through the capacitive element C11, C12. Yet alternatively, the auxiliary charging circuits 83 and 84 may each consist of a Zener diode connected between the input terminal 11, 12 and the capacitive element C11, C12 such that a current flows in the opposite direction from the input terminal 11, 12 to the capacitive element C11, C12. Yet alternatively, the auxiliary charging circuits 83 and 84 may each include a diode connected between the input terminal 11, 12 and the capacitive element C11, C12 in the direction in which a current flows from the input terminal 11, 12 to the capacitive element C11, C12, and a Zener diode connected to the diode in series in the opposite direction from the diode. Yet alternatively, the auxiliary charging circuits 83, 84 may each include a resistor and a diode connected to the resistor in series in the direction in which a current flows from the input terminal 11, 12 to the capacitive element C11, C12 or may consist of the resistor.

The dimmer 1 of the embodiment described above does not have to be applied to such a load 9 using LED elements as a light source but is also applicable to a light source including a capacitor input type circuit, having high impedance, and lighting with a small amount of current supplied. Examples of this type of light sources include an organic electroluminescent (EL) element. The dimmer is also applicable to a discharge lamp and various other types of loads 9 as well.

Also, the control unit 6 does not have to control the bidirectional switch 2 by the exemplary method described above. Alternatively, a method of alternately turning the first control signal or the second control signal into an "ON" signal at the same intervals as the AC voltage Vac may also be adopted. In that case, while one, having the higher potential with respect to the AC voltage Vac, of the switching elements Q1 and Q2 is ON, the bidirectional switch 2 becomes electrically conductive. That is to say, according to this variation, so-called "reverse phase control," in which the components between the pair of input terminals 11 and 12 become electrically conductive during an interval from the zero-crossing point of the AC voltage Vac to a middle of a half cycle, is realized. In that case, adjusting the phase difference between the first control signal and the second control signal and the AC voltage Vac allows the electrically conductive period of the bidirectional switch 2 to be controlled.

Furthermore, the switching elements Q1 and Q2 that form the bidirectional switch 2 do not have to be implemented as enhancement n-channel MOSFETs but may also be implemented as insulated gate bipolar transistors (IGBTs) as well. Furthermore, in the bidirectional switch 2, the rectifiers (diodes) that realize the unidirectional ON state do not have to be parasitic diodes of the switching elements Q1 and Q2 but may also be external diodes. Each of the diodes and an associated one of the switching elements Q1 and Q2 may be built in the same package. Furthermore, the diodes D1 and D2 of the embodiment described above are not essential constituent elements for the dimmer 1 but may be omitted as appropriate.

Furthermore, the bidirectional switch 2 is made up of the two switching elements Q1 and Q2, the respective sources of which are connected together. Alternatively, the bidirectional switch may also be implemented as a single switching element configured to selectively cut off or pass bidirectional currents. Examples of this type of switching elements include a switching element with a double gate structure. That is to say, the bidirectional switch may also be implemented as a semiconductor device having a double gate (or dual gate) structure and made of a wide-bandgap semiconductor material such as GaN (gallium nitride).

Also, the protection circuit 8 of this embodiment is for use in the dimmer 1 including the pair of input terminals 11 and 12, the bidirectional switch 2, and the control unit 6. In the embodiment described above, the protection circuit 8 is provided inside of the dimmer 1. However, this is only an example and should not be construed as limiting. Alternatively, the protection circuit 8 may also be provided outside of the dimmer 1. That is to say, the protection circuit 8 does not always include the pair of input terminals 11 and 12, the bidirectional switch 2, and the control unit 6 as essential constituent elements.

Second Embodiment

Figure 3:
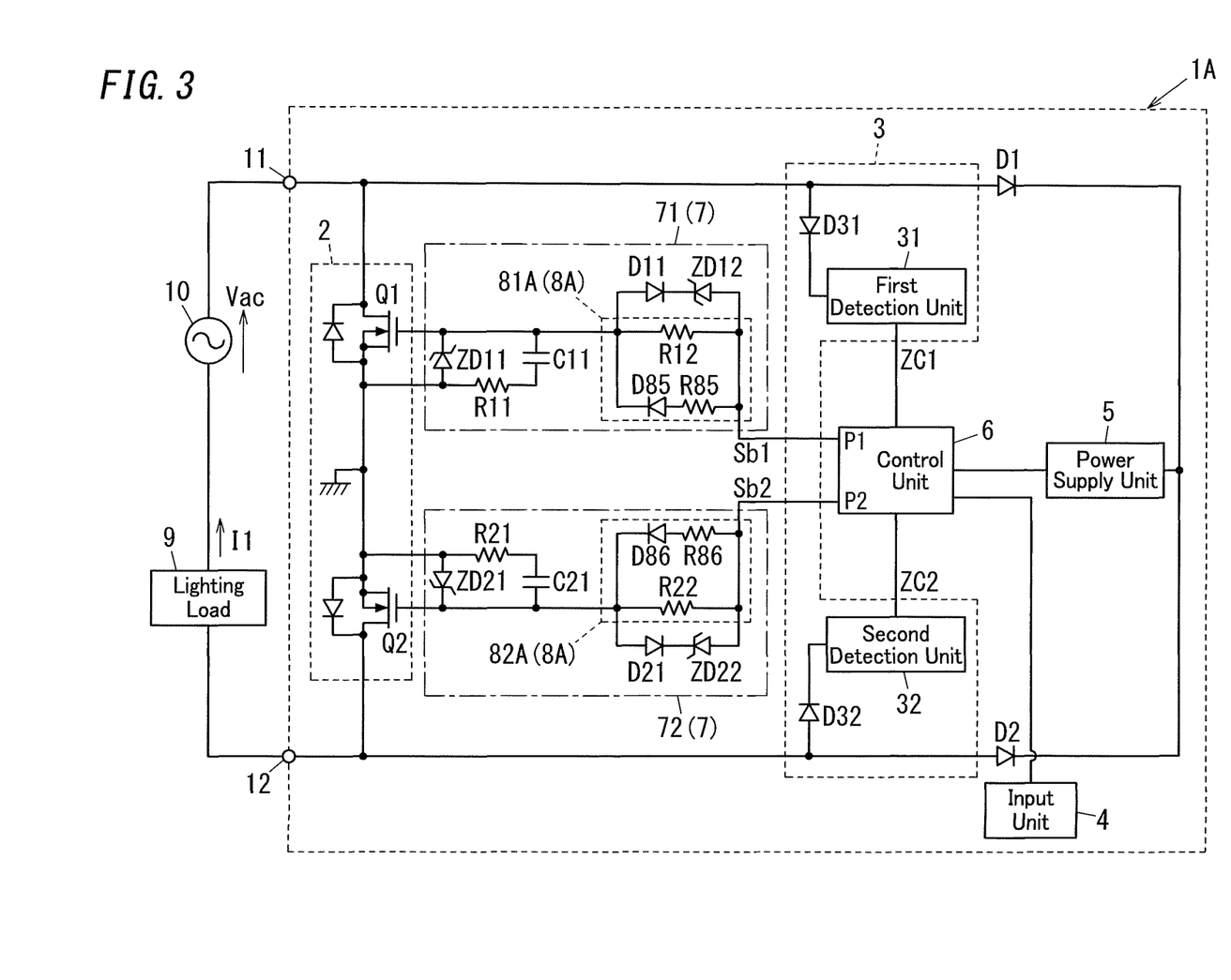
FIG. 3 is a circuit diagram of a dimmer according to a second embodiment.

Next, a dimmer 1A according to a second embodiment will be described with reference to FIG. 3.

The dimmer 1A of the second embodiment includes a protection circuit 8A with a different configuration from the protection circuit 8 of the first embodiment, which is a major difference between the first and second embodiments. In the following description, any constituent member of the dimmer 1A of the second embodiment, having the same function as a counterpart of the dimmer 1 of the first embodiment described above, will be designated by the same reference numeral as that counterpart's, and a detailed description thereof will be omitted herein.

The protection circuit 8A of this embodiment includes a first charging/discharging regulator circuit 81A for reducing counter electromotive force to be generated when the switching element Q1 is cut off and a second charging/discharging regulator circuit 82A for reducing counter electromotive force to be generated when the switching element Q2 is cut off.

The first charging/discharging regulator circuit 81A includes the resistor R12, a diode D85, and a resistor R85, which form parts of the first drive unit 71. The resistor R12 is connected between a connection node, where the gate of the switching element Q1 and the capacitive element C11 are connected together, and the output terminal P1 of the control unit 6. The series circuit of the diode D85 and the resistor R85 is connected between both terminals of the resistor R12. The diode D85 is connected in such a direction that a current flows from the output terminal P1 of the control unit 6 to the capacitive element C11. Thus, in the first charging/discharging regulator circuit 81A, a charging circuit allowing a charging current to flow from the control unit 6 toward the capacitive element C11 is implemented as a circuit in which the resistor R12 and the series circuit of the diode D85 and the resistor R85 are connected together in parallel. On the other hand, in the first charging/discharging regulator circuit 81A, a discharging circuit allowing a discharging current to flow from the capacitive element C11 is implemented as a resistor R12. Thus, the discharging circuit allowing the discharging current to flow from the capacitive element C11 comes to have a greater impedance than the charging circuit allowing the charging current to flow toward the capacitive element C11. That is to say, the rate of fall of the voltage between both terminals of the capacitive element C11 when the control unit 6 turns the switching element Q1 from ON to OFF becomes lower than the rate of rise of the voltage between both terminals of the capacitive element C11 when the control unit 6 turns the switching element Q1 from OH to ON. In this embodiment, the resistance value of the resistor R21 and the resistance value of the resistor R85 are both 22 k$\Omega$, and the impedance of the discharging circuit is approximately twice as high as the impedance of the charging circuit. Note that the resistance value of the resistor R21 and resistor R85 is only an example and should not be construed as limiting, but may be changed as appropriate.

The second charging/discharging regulator circuit 82A includes the resistor R22, a diode D86, and a resistor R86, which form parts of the second drive unit 72. The resistor R22 is connected between a connection node, where the gate of the switching element Q2 and the capacitive element C21 are connected together, and the output terminal P2 of the control unit 6. The series circuit of the diode D86 and the resistor R86 is connected between both terminals of the resistor R22. The diode D86 is connected in such a direction that a current flows from the output terminal P2 of the control unit 6 to the capacitive element C21. Thus, in the second charging/discharging regulator circuit 82A, a charging circuit allowing a charging current to flow from the control unit 6 toward the capacitive element C21 is implemented as a circuit in which the resistor R22 and the series circuit of the diode D86 and the resistor R86 are connected together in parallel. On the other hand, in the second charging/discharging regulator circuit 82A, a discharging circuit allowing a discharging current to flow from the capacitive element C21 is implemented as a resistor R22. Thus, the discharging circuit allowing the discharging current to flow from the capacitive element C21 comes to have a greater impedance than the charging circuit allowing the charging current to flow toward the capacitive element C21. That is to say, the rate of fall of the voltage between both terminals of the capacitive element C21 when the control unit 6 turns the switching element Q2 from ON to OFF becomes lower than the rate of rise of the voltage between both terminals of the capacitive element C21 when the control unit 6 turns the switching element Q2 from OFF to ON. In this embodiment, the resistance value of the resistor R22 and the resistance value of the resistor R86 are both 22 kΩ2, and the impedance of the discharging circuit is approximately twice as high as the impedance of the charging circuit. Note that the resistance value of the resistor R22 and resistor R86 is only an example and should not be construed as limiting, but may be changed as appropriate.

Next, it will be described how the dimmer 1A of this embodiment performs a lighting control operation.

First, it will be described how the dimmer 1 operates in a half cycle during which the AC voltage Vac is positive.

At the end point of the half cycle during which the AC voltage Vac is negative, the bidirectional switch 2 is controlled to maintain the bidirectional OFF state. Thus, in the interval from the starting point of the half cycle with positive polarity to a point in time when the first detection signal ZC1 is input, the control unit 6 maintains the bidirectional switch 2 in the bidirectional OFF state.

When the AC voltage Vac reaches a positive prescribed value in the half cycle during which the AC voltage Vac is positive, the first detection unit 31 outputs the first detection signal ZC1 to the control unit 6.

On receiving the first detection signal ZC1 from the first detection unit 31 in the half cycle during which the AC voltage Vac is positive, the control unit 6 turns the first control signal Sb1 and the second control signal Sb2 into "ON" signals.

This allows, in the first drive unit 71, a current to flow through the capacitive element C11 via the circuit in which the resistor R12 and the series circuit of the resistor R85 and the diode D85 are connected together in parallel to increase the voltage between both terminals of the capacitive element C11. When the voltage between both terminals of the capacitive element C11 becomes equal to or greater than a threshold voltage, the switching element Q1 turns ON. Likewise, in the second drive unit 72, a current is allowed to flow through the capacitive element C21 via the circuit in which the resistor R22 and the series circuit of the resistor R86 and the diode D86 are connected together in parallel to increase the voltage between both terminals of the capacitive element C21. When the voltage between both terminals of the capacitive element C21 becomes equal to or greater than a threshold voltage, the switching element Q2 turns ON. At this time, the switching elements Q1 and Q2 both turn ON to let the bidirectional switch 2 enter the bidirectional ON state. Thus, power is supplied from the AC power supply 10 to the load 9 via the bidirectional switch 2, thus lighting the load 9.

At a point in time when an ON-state period, of which the duration is determined by the lighting control signal, passes since a point in time when the first detection signal ZC1 is input, the control unit 6 turns the first control signal Sb1 into an "OFF" signal while keeping the second control signal Sb2 the "ON" signal.

At this time, in the first drive unit 71, if the voltage between both terminals of the capacitive element C11 is greater than the Zener voltage of the Zener diode ZD12, then the Zener diode ZD12 turns ON. Since a discharging current flows from the capacitive element C11 through the diode D11 and the Zener diode ZD12, the voltage between both terminals of the capacitive element C11 falls down to the Zener voltage of the Zener diode ZD12 in a short time. Once the voltage between both terminals of the capacitive element C11 has become lower than the Zener voltage of the Zener diode ZD12, the Zener diode ZD12 turns OFF, and a discharging current flows from the capacitive element C11 via the resistor R12. Thereafter, when the voltage between both terminals of the capacitive element C11 becomes lower than the threshold voltage, the load current flowing through the switching element Q1 decreases.

In this case, when the load current flowing through the switching element Q1 decreases, counter electromotive force is generated by the inductance component included in the impedance of the electrical path connecting the dimmer 1, the AC power supply 10, and the load 9 together and other components. As the amount of the load current flowing when the switching element Q1 turns from ON to OFF increases, the counter electromotive force generated by the inductance component of the electrical path increases.

In this embodiment, the discharging circuit allowing a discharging current to flow from the capacitive element C11 when the switching element Q1 is turned from ON to OFF has a greater impedance than the charging circuit allowing a charging current to flow toward the capacitive element C11 when the switching element Q1 is turned from OFF to ON. Therefore, the rate of fall of the voltage between both terminals of the capacitive element C11 becomes lower than in a situation where the impedance of the charging circuit is equal to the impedance of the discharging circuit. This slows down the rate of decrease in the amount of the load current flowing through the switching element Q1, thus reducing the counter electromotive force to be generated on the electrical path.

Thereafter, the voltage between both terminals of the capacitive element C11 falls gradually and the load current flowing through the switching element Q1 decreases to turn the switching element Q1 OFF eventually. At this time, only the switching element Q1 turns OFF, out of the switching elements Q1 and Q2, to let the bidirectional switch 2 enter a reverse ON state. This cuts off the supply of power from the AC power supply 10 to the load 9.

Also, at a point in time when a half cycle minus a certain amount of time passes since the point in time of generation of the first detection signal ZC1, the control unit 6 turns the first control signal Sb1 and the second control signal Sb2 into "OFF" signals.

At this time, in the second drive unit 72, if the voltage between both terminals of the capacitive element C21 is greater than the Zener voltage of the Zener diode ZD22, then the Zener diode ZD22 turns ON. Since a discharging current flows from the capacitive element C21 through the diode D21 and the Zener diode ZD22, the voltage between both terminals of the capacitive element C21 falls down to the Zener voltage of the Zener diode ZD22 in a short time. Once the voltage between both terminals of the capacitive element C21 has become lower than the Zener voltage of the Zener diode ZD22, the Zener diode ZD22 turns OFF, and a discharging current flows from the capacitive element C21 via the resistor R22. Thereafter, when the voltage between both terminals of the capacitive element C21 becomes lower than the threshold voltage, the switching element Q2 turns OFF. That is to say, the switching elements Q1 and Q2 both turn OFF to let the bidirectional switch 2 enter the bidirectional OFF state.

In the half cycle during which the AC voltage Vac is negative, the dimmer 1 operates basically in the same way as in the half cycle during which the AC voltage Vac is positive.

At the end point of the half cycle during which the AC voltage Vac is positive, the bidirectional switch 2 is controlled to maintain the bidirectional OFF state. Thus, in the interval from the starting point of the half cycle with negative polarity to a point in time when the second detection signal ZC2 is input, the control unit 6 maintains the bidirectional switch 2 in the bidirectional OFF state.

When the AC voltage Vac reaches a negative prescribed value in the half cycle during which the AC voltage Vac is negative, the second detection unit 32 outputs the second detection signal ZC2 to the control unit 6.

On receiving the second detection signal ZC2 from the second detection unit 32 in the half cycle during which the AC voltage Vac is negative, the control unit 6 turns the first control signal Sb1 and the second control signal Sb2 into "ON" signals.

This allows, in the first drive unit 71, a current to flow through the capacitive element C11 via the circuit in which the resistor R12 and the series circuit of the resistor R85 and the diode D85 are connected together in parallel to increase the voltage between both terminals of the capacitive element C11. When the voltage between both terminals of the capacitive element C11 becomes equal to or greater than a threshold voltage, the switching element Q1 turns ON. Likewise, in the second drive unit 72, a current is allowed to flow through the capacitive element C21 via the circuit in which the resistor R22 and the series circuit of the resistor R86 and the diode D86 are connected together in parallel to increase the voltage between both terminals of the capacitive element C21. When the voltage between both terminals of the capacitive element C21 becomes equal to or greater than a threshold voltage, the switching element Q2 turns ON. At this time, the switching elements Q1 and Q2 both turn ON to let the bidirectional switch 2 enter the bidirectional ON state. Thus, power is supplied from the AC power supply 10 to the load 9 via the bidirectional switch 2, thus lighting the load 9.

Thereafter, at a point in time when an ON-state period, of which the duration is determined by the lighting control signal, passes since a point in time when the second detection signal ZC2 is input in the half cycle during which the AC voltage Vac is negative, the control unit 6 turns the second control signal Sb2 into an "OFF" signal while keeping the first control signal Sb1 the "ON" signal.

At this time, in the second drive unit 72, if the voltage between both terminals of the capacitive element C21 is greater than the Zener voltage of the Zener diode ZD22, then the Zener diode ZD22 turns ON. Since a discharging current flows from the capacitive element C21 through the diode D21 and the Zener diode ZD22, the voltage between both terminals of the capacitive element C21 falls down to the Zener voltage of the Zener diode ZD22 in a short time. Once the voltage between both terminals of the capacitive element C21 has become lower than the Zener voltage of the Zener diode ZD22, the Zener diode ZD22 turns OFF, and a discharging current flows from the capacitive element C21 via the resistor R22. Thereafter, when the voltage between both terminals of the capacitive element C21 becomes lower than the threshold voltage, the load current flowing through the switching element Q2 decreases.

In this case, when the load current flowing through the switching element Q2 decreases, counter electromotive force is generated by the inductance component included in the impedance of the electrical path connecting the dimmer 1, the AC power supply 10, and the load 9 together and other components. As the amount of the load current flowing when the switching element Q2 turns from ON to OFF increases, the counter electromotive force generated by the inductance component of the electrical path increases.

In the second charging/discharging regulator circuit 82, the discharging circuit allowing a discharging current to flow from the capacitive element C21 when the switching element Q2 is turned from ON to OFF has a greater impedance than the charging circuit allowing a charging current to flow toward the capacitive element C21 when the switching element Q2 is turned from OFF to ON. Therefore, the rate of fall of the voltage between both terminals of the capacitive element C21 becomes lower than in a situation where the impedance of the charging circuit is equal to the impedance of the discharging circuit. This slows down the rate of decrease in the amount of the load current flowing through the switching element Q2, thus reducing the counter electromotive force to be generated on the electrical path.

Thereafter, the voltage between both terminals of the capacitive element C21 falls gradually and the load current flowing through the switching element Q2 decreases to turn the switching element Q2 OFF eventually. At this time, only the switching element Q2 turns OFF, out of the switching elements Q1 and Q2, to let the bidirectional switch 2 enter a reverse ON state. This cuts off the supply of power from the AC power supply 10 to the load 9.

Also, at a point in time when a half cycle minus a certain amount of time passes since the point in time of generation of the second detection signal ZC2 in the half cycle during which the AC voltage Vac is negative, the control unit 6 turns the first control signal Sb1 and the second control signal Sb2 into "OFF" signals.

At this time, in the first drive unit 71, if the voltage between both terminals of the capacitive element C11 is greater than the Zener voltage of the Zener diode ZD12, then the Zener diode ZD12 turns ON. Since a discharging current flows from the capacitive element C11 through the diode D11 and the Zener diode ZD12, the voltage between both terminals of the capacitive element C11 falls down to the Zener voltage of the Zener diode ZD12 in a short time. Once the voltage between both terminals of the capacitive element C11 has become lower than the Zener voltage of the Zener diode ZD12, the Zener diode ZD12 turns OFF, and a discharging current flows from the capacitive element C11 via the resistor R12. Thereafter, when the voltage between both terminals of the capacitive element C11 becomes lower than the threshold voltage, the switching element Q1 turns OFF. That is to say, the switching elements Q1 and Q2 both turn OFF to let the bidirectional switch 2 enter the bidirectional OFF state.

The dimmer 1 of this embodiment alternately and repeatedly performs the operation for the half cycle with positive polarity and the operation for the half cycle with negative polarity every half cycle of the AC voltage Vac, thereby controlling the lighting level of the load 9.

In a protection circuit 8A for a dimmer 1 according to a fifth aspect, which may be implemented in conjunction with the first aspect, the charging/discharging regulator circuit (the first charging/discharging regulator circuit 81A or the second charging/discharging regulator circuit 82A) includes: a charging circuit configured to allow a charging current to flow therethrough toward the capacitive element C11, C12; and a discharging circuit configured to allow a discharging current to flow therethrough from the capacitive element C11, C12. The discharging circuit has a greater impedance than the charging circuit. The discharging circuit's having greater impedance than the charging circuit decreases the amount of a discharging current flowing from the capacitive element C11, C12 compared to a situation where the impedance of the charging circuit is equal to that of the discharging circuit, thus slowing down the rate of fall of the voltage between both terminals of the capacitive element C11, C12. This reduces the counter electromotive force to be generated when the bidirectional switch 2 turns from ON to OFF.

In a protection circuit 8 for a dimmer 1 according to a sixth aspect, which may be implemented in conjunction with the fifth aspect, the charging/discharging regulator circuit includes a first impedance element (the resistor R12, R22), a diode (D85, D86), and a second impedance element (the resistor R85, R86). The first impedance element is electrically connected between a connection node, where the control terminal of the bidirectional switch 2 and the capacitive element (C11, C21) are connected together, and an output terminal (P1, P2) of the control unit 6. The series circuit of the diode and the second impedance element is electrically connected between both terminals of the first impedance element. The diode is connected in such a direction that a charging current is allowed to flow toward the capacitive element (C11, C12) via the diode itself and the second impedance element. The charging circuit includes a parallel circuit in which the first impedance element and the series circuit of the diode and the second impedance element are connected together in parallel. The discharging circuit includes the first impedance element. This allows the discharging circuit to have a greater impedance than the charging circuit, thus reducing the amount of the discharging current flowing from the capacitive element C11, C21 and slowing down the rate of fall of the voltage between both terminals of the capacitive element C11, C21. This reduces the counter electromotive force to be generated when the bidirectional switch 2 turns from ON to OFF.

Note that the charging/discharging regulator circuit (the first charging/discharging regulator circuit 81A or the second charging/discharging regulator circuit 82A) does not have to have the circuit configuration described for the exemplary embodiment. Rather, the circuit configuration of the charging/discharging regulator circuit may be modified as appropriate as long as the circuit configuration allows the discharging circuit in which the discharging current flows from the capacitive element C11, C21 to have a greater impedance than the charging circuit in which the charging current flows toward the capacitive element C11, C21. In the embodiment described above, the first impedance element and the second impedance element are each implemented as a single resistor. However, this is only an example and should not be construed as limiting. Alternatively, each of the first and second impedance elements may also be implemented as a plurality of resistor connected together in series or in parallel. Also, in the embodiment described above, the diode (D85, D86) is connected between the second impedance element (R85, R86) and the capacitive element (C11, C21). Alternatively, the diode may also be connected between the second impedance element and the output terminal (P1, P2) of the control unit 6.

The configuration described for the second embodiment may be employed as appropriate in combination with the configuration described for the first embodiment (including variations thereof).

A dimmer 1 according to a seventh aspect includes a pair of input terminals 11 and 12, a bidirectional switch 2, a control unit 6, and a protection circuit 8 according to any one of the first to sixth aspects. The pair of input terminals 11 and 12 is configured to be electrically connected in series between a lighting load 9 and an AC power supply 10. The bidirectional switch 2 is configured to selectively cut off or pass a bidirectional current between the pair of input terminals 11 and 12. The control unit 6 is configured to control the bidirectional switch 2 so as to turn the bidirectional switch 2 from ON to OFF at a point in time when an amount of time, varying according to a lighting level, passes since a starting point of a half cycle of an AC voltage of the AC power supply 10.

In other words, the dimmer 1 of the embodiment described above includes a switch unit (bidirectional switch 2), a synch signal generation unit (phase detection unit 3), a control power supply unit (power supply unit 5), and a control unit 6, and further includes the protection circuit 8, 8A described above. The switch unit is connected to the load 9 in series with respect to the AC power supply 10 to perform phase control on the AC voltage Vac applied to the load 9. The synch signal generation unit generates a synch signal (the first detection signal ZC1 or the second detection signal ZC2) synchronized with an AC voltage waveform of the AC power supply 10. The control power supply unit includes a capacitive element, which is connected to the switch unit in parallel, converts the AC power supply 10 into a predetermined control power supply, makes the start and stop of the conversion operation controllable, and stores the control power. The control unit 6 is supplied with the control power by the control power supply unit via the capacitive element, and divides the period of each half cycle of the AC voltage Vac into three intervals in accordance with the synch signal generated by the synch signal generation unit. In the first interval (i.e., an interval from the starting point of each half cycle to a point in time when the first detection signal ZC1 or the second detection signal ZC2 is input), the control unit 6 makes the switch unit electrically unconductive to cut off the supply of power to the load 9 and activate the conversion operation of the control power supply unit. In the second interval (i.e., an interval from the point in time when the first detection signal ZC1 or the second detection signal ZC2 is input to a point in time when the ON period passes), the control unit 6 makes the switch unit electrically conductive to supply power to the load 9 and deactivate the operation of the control power supply unit. In the third interval (i.e., an interval from the point in time when the ON period passes since when the first detection signal ZC1 or the second detection signal ZC2 was input through the end point of each half cycle), the control unit 6 makes the switch unit electrically unconductive to cut off the supply of power to the load 9 and activate the conversion operation of the control power supply unit.

REFERENCE SIGNS LIST 1, 1A Dimmer
11, 12 Input Terminal
2 Bidirectional Switch
6 Control Unit
7 Switch Drive Unit
8, 8A Protection Circuit
81, 81A First Charging/Discharging Regulator Circuit
82, 82A Second Charging/Discharging Regulator Circuit
83, 84 Auxiliary Charging Circuit
Q1, Q2 Switching Element C11, C21 Capacitive Element
C83, C84 Capacitive Element
R83, R84 Resistor
R12, R22 First Impedance Element
R85, R86 Second Impedance Element
D85, D86 Diode
Vac AC Voltage

The invention claimed is:

1. A protection circuit for use in a dimmer, the dimmer comprising: a pair of input terminals configured to be electrically connected in series between a lighting load and an AC power supply; a bidirectional switch configured to selectively cut off or pass a bidirectional current between the pair of input terminals; and a control unit configured to control the bidirectional switch so as to turn the bidirectional switch from ON to OFF at a point in time when an amount of time, varying according to a lighting level, passes since a starting point of a half cycle of an AC voltage of the AC power supply, the bidirectional switch having a control terminal, to which a capacitive element is electrically connected, the bidirectional switch turning from OFF to ON when a voltage between both terminals of the capacitive element becomes equal to or greater than a threshold voltage, the protection circuit comprising a charging/discharging regulator circuit configured to make a rate of fall of the voltage between both of the terminals of the capacitive element when the control unit turns the bidirectional switch from ON to OFF lower than a rate of rise of the voltage between both of the terminals of the capacitive element when the control unit turns the bidirectional switch from OFF to ON.

2. The protection circuit of claim 1, wherein
the charging/discharging regulator circuit includes an auxiliary charging circuit configured to allow a charging current to flow from the pair of input terminals to the capacitive element, and
the auxiliary charging circuit is configured to change a current value of the charging current according to a voltage value of a voltage applied between the pair of input terminals.

3. The protection circuit of claim 2, wherein the auxiliary charging circuit includes a series circuit of another capacitive element and a resistor.

4. The protection circuit of claim 2, wherein the auxiliary charging circuit includes a passive component.

5. The protection circuit of claim 1, wherein
the charging/discharging regulator circuit includes: a charging circuit configured to allow a charging current to flow therethrough toward the capacitive element; and a discharging circuit configured to allow a discharging current to flow therethrough from the capacitive element, and
the discharging circuit has a greater impedance than the charging circuit.

6. The protection circuit of claim 5, wherein
the charging/discharging regulator circuit includes: a first impedance element electrically connected between a connection node, where the control terminal and the capacitive element are connected together, and an output terminal of the control unit; and a series circuit of a diode and a second impedance element, the diode and the second impedance element being electrically connected in series between both terminals of the first impedance element, the diode is connected in such a direction that a charging current is allowed to flow toward the capacitive element via the diode itself and the second impedance element, the charging circuit includes a parallel circuit in which the first impedance element and the series circuit of the diode and the second impedance element are connected together in parallel, and the discharging circuit includes the first impedance element.

7. A dimmer comprising:
a pair of input terminals configured to be electrically connected in series between a lighting load and an AC power supply;
a bidirectional switch configured to selectively cut off or pass a bidirectional current between the pair of input terminals;
a control unit configured to control the bidirectional switch so as to turn the bidirectional switch from ON to OFF at a point in time when an amount of time, varying according to a lighting level, passes since a starting point of a half cycle of an AC voltage of the AC power supply; and
a protection circuit
wherein:
the bidirectional switch has a control terminal, to which a capacitive element is electrically connected, the bidirectional switch turning from OFF to ON when a voltage between both terminals of the capacitive element becomes equal to or greater than a threshold voltage, and
the protection circuit comprising a charging/discharging regulator circuit configured to make a rate of fall of the voltage between both of the terminals of the capacitive element when the control unit turns the bidirectional switch from ON to OFF lower than a rate of rise of the voltage between both of the terminals of the capacitive element when the control unit turns the bidirectional switch from OFF to ON.

8. The protection circuit of claim 3, wherein the auxiliary charging circuit includes a passive component.

9. The dimmer of claim 7, wherein:
the charging/discharging regulator circuit includes an auxiliary charging circuit configured to allow a charging current to flow from the pair of input terminals to the capacitive element, and
the auxiliary charging circuit is configured to change a current value of the charging current according to a voltage value of a voltage applied between the pair of input terminals.

10. The dimmer of claim 9, wherein the auxiliary charging circuit includes a series circuit of another capacitive element and a resistor.

11. The dimmer of claim 9, wherein the auxiliary charging circuit includes a passive component.

12. The dimmer of claim 7, wherein:
the charging/discharging regulator circuit includes: a charging circuit configured to allow a charging current to flow therethrough toward the capacitive element; and a discharging circuit configured to allow a discharging current to flow therethrough from the capacitive element, and
the discharging circuit has a greater impedance than the charging circuit.

13. The dimmer of claim 12, wherein:
the charging/discharging regulator circuit includes: a first impedance element electrically connected between a connection node, where the control terminal and the capacitive element are connected together, and an output terminal of the control unit; and a series circuit of a diode and a second impedance element, the diode and the second impedance element being electrically connected in series between both terminals of the first impedance element, the diode is connected in such a direction that a charging current is allowed to flow toward the capacitive element via the diode itself and the second impedance element, the charging circuit includes a parallel circuit in which the first impedance element and the series circuit of the diode and the second impedance element are connected together in parallel, and the discharging circuit includes the first impedance element.

14. The dimmer of claim 10, wherein the auxiliary charging circuit includes a passive component.

* * * * *